US011286313B2

(12) United States Patent
Laukkanen et al.

(10) Patent No.: US 11,286,313 B2
(45) Date of Patent: Mar. 29, 2022

(54) PARENCHYMAL CELLULOSE COMPOSITION

(71) Applicant: Betulium Oy, Espoo (FI)

(72) Inventors: Antti Laukkanen, Helsinki (FI); Jason McKee, Helsinki (FI); Nikolaos Pahimanolis, Espoo (FI)

(73) Assignee: BETULIUM OY, Espoo (FI)

( * ) Notice: Subject to any disclaimer, the term of this patent is extended or adjusted under 35 U.S.C. 154(b) by 0 days.

(21) Appl. No.: 16/312,600

(22) PCT Filed: Jun. 30, 2017

(86) PCT No.: PCT/FI2017/050492
§ 371 (c)(1),
(2) Date: Dec. 21, 2018

(87) PCT Pub. No.: WO2018/002445
PCT Pub. Date: Jan. 4, 2018

(65) Prior Publication Data
US 2019/0185585 A1   Jun. 20, 2019

(30) Foreign Application Priority Data

Jun. 30, 2016 (FI) ........................ 20165538

(51) Int. Cl.
*C08B 1/00* (2006.01)
*C08J 9/00* (2006.01)
*C08J 9/28* (2006.01)
*F26B 5/06* (2006.01)
*C08L 1/02* (2006.01)

(52) U.S. Cl.
CPC .............. *C08B 1/00* (2013.01); *C08J 9/0004* (2013.01); *C08J 9/28* (2013.01); *C08L 1/02* (2013.01); *F26B 5/06* (2013.01); *C08J 2201/03* (2013.01); *C08J 2201/0484* (2013.01); *C08J 2205/022* (2013.01); *C08J 2205/042* (2013.01); *C08J 2205/044* (2013.01); *C08J 2207/10* (2013.01); *C08J 2301/02* (2013.01); *C08J 2301/18* (2013.01); *C08L 2205/16* (2013.01)

(58) Field of Classification Search
CPC ....................................................... C08B 1/00
See application file for complete search history.

(56) References Cited

U.S. PATENT DOCUMENTS

| 4,374,702 | A | * | 2/1983 | Turbak | D01D 5/11 162/100 |
| 4,481,076 | A | * | 11/1984 | Herrick | C08L 1/02 162/158 |
| 4,831,127 | A | * | 5/1989 | Weibel | D21C 5/00 106/163.01 |
| 5,366,750 | A | * | 11/1994 | Morano | A23P 20/20 426/572 |
| 5,964,983 | A | * | 10/1999 | Dinand | C09K 8/206 162/187 |
| 6,083,582 | A | * | 7/2000 | Chen | C08B 15/08 428/34.8 |
| 6,231,657 | B1 | | 5/2001 | Cantiani et al. | |
| 6,485,767 | B1 | * | 11/2002 | Cantiani | A23L 29/262 426/96 |
| 6,967,027 | B1 | * | 11/2005 | Heux | C08J 3/03 424/484 |
| 2001/0004869 | A1 | | 6/2001 | Cantiani et al. | |
| 2007/0224419 | A1 | * | 9/2007 | Sumnicht | D21C 9/005 428/364 |
| 2013/0345416 | A1 | * | 12/2013 | Laukkanen | B01J 13/0069 536/85 |
| 2015/0045549 | A1 | * | 2/2015 | Laukkanen | C08L 1/02 536/85 |
| 2015/0141531 | A1 | * | 5/2015 | Bras | C08B 15/00 516/77 |
| 2015/0158954 | A1 | * | 6/2015 | Cha | C08B 15/00 424/728 |
| 2015/0191612 | A1 | * | 7/2015 | Van Engelen | D21H 21/52 524/35 |
| 2015/0210957 | A1 | * | 7/2015 | Napolitano | C11D 11/0094 510/424 |
| 2017/0121908 | A1 | * | 5/2017 | Holtan | D21C 9/007 |
| 2018/0084802 | A1 | * | 3/2018 | McKee | A23K 10/26 |

FOREIGN PATENT DOCUMENTS

| EP | 0120471 A2 | 10/1984 |
| JP | S6044537 A | 3/1985 |
| WO | 9802487 A1 | 1/1998 |
| WO | 2016075371 A1 | 5/2016 |
| WO | 2016177937 A1 | 11/2016 |

OTHER PUBLICATIONS

Cheng et al. (Carbohydrate Polymers 123, 2015, 157-163) (Year: 2015).*
Finnish Patent Registration Office, Search Report, Application No. 20165538, dated Jan. 27, 2017, 2 pages.
International Search Report and Written Opinion of the International Searching Authority, Application No. PCT/FI2017/050492, dated Jan. 9, 2018, 5 pages.
Butchosa, Núria, et al., "Water Redispersible Cellulose Nanofibrils Adsorbed With Carboxymethyl Cellulose", Cellulose, Original Paper, vol. 21, Issue 6, Dec. 2014, pp. 4349-4358.
Eichhorn, S. J., et al., "Review: Current International Research into Cellulose Nanofibres and Nanocomposites", Journal of Materials Science, vol. 45, Issue 01, Jan. 2010, pp. 1-33.

(Continued)

*Primary Examiner* — Liam J Heincer
(74) *Attorney, Agent, or Firm* — Ziegler IP Law Group, LLC

(57) ABSTRACT

Methods for manufacturing, re-activating and using compositions including fibrillated parenchymal cellulose and activator are provided. The activator has a low molecular weight and is used to facilitate reactivation.

20 Claims, No Drawings

(56) References Cited

OTHER PUBLICATIONS

Lavoine, Nathalie, et al., "Microfibrillated Cellulose—Its Barrier Properties and Applications in Cellulosic Materials: A Review", Carbohydrate Polymers, vol. 90, Issue 2, Oct. 1, 2012, pp. 735-764.

Missoum, Karim, et al., "Water Redispersible Dried Nanofibrillated Cellulose by Adding Sodium Chloride", Biomacromolecules, Voume 13, Issue 12, Nov. 9, 2012, pp. 4118-4125.

Peng, Yucheng, et al., "Drying cellulose nanofibrils: in search of a suitable method", Cellulose, vol. 19, Issue 01, Feb. 2012, pp. 91-102.

Voronova, Marina I., et al., "The Effect of Drying Technique of Nanocellulose Dispersions on Properties of Dried Materials", Materials Letters, vol. 68, Feb. 1, 2012, pp. 164-167.

Žepič, Vesna, et al., "Morphological, Thermal, and Structural Aspects of Dried and Redispersed Nanofibrillated Cellulose (NFC)", De Gruyter, vol. 68, Issue 06, Jan. 18, 2014, pp. 657-667.

International Preliminary Report on Patentability and Written Opinion received for International Patent Application No. PCT/FI2017/050492, dated Jan. 1, 2019, 6 pages.

\* cited by examiner

PARENCHYMAL CELLULOSE COMPOSITION

BACKGROUND

Microfibrillated parenchymal cellulose can be produced at medium solids content for various applications such as binders, rheology modifiers, emulsifiers and composites. It is, however, obtained as a water suspension with high water content. High moisture content is problematic adding cost in transportation, storage and shelf-life of the product. Removal of water causes aggregation of fibrils and hornification, yielding a dramatic loss of the intended properties upon re-suspending the product.

So far, various drying methods have been proposed to facilitate resuspension of wood-based microfibrillated cellulose. Freeze-drying and spray-drying (Zepic et al. Holzforschung 2014 68 (6); Peng et al. Cellulose 2011 19 (1) 91-102; Voronova, et al. Materials Letters 2012 (68) 164-167), and additives, such as cationic surfactant (Eichhorn, J Mat Sci 2009 45 (1) 1-33), carboxymethyl cellulose (Butchosa and Zhou, Cellulose 2014 21 4349-4358), sodium polyacrylate and cationic polyacrylamide (Lavoine, et al. Carbohydr. Polym. 2012 90 (2) 735-764) have been shown to prevent hornification of fibrils to some extent. Combining freeze-drying and NaCl addition has been reported to completely recover the properties of cellulose microfibrils (Missoum et al. Biomacromol 2012 13 (12) 4118-4125). The above methods to remove water have limitations and are difficult to scale-up, and do not always prevent the agglomeration of the fibrils.

There are patents describing the use of wood-based microfibrillated cellulose dispersions to stabilized water non-dispersive materials, such as oils, beginning from 1980 (Turbak U.S. Pat. No. 4,378,381A) However, these dispersions rely on chemical surface modification of microfibrillated cellulose and the dispersions are of low solids content, typically few percents of the total weight of dispersions.

SUMMARY

The inventors have surprisingly found that a liquid activator facilitates resuspension of a de-hydrated fibrillated parenchymal cellulose product.

According to a first aspect is provided a composition comprising fibrillated parenchymal cellulose, at least one liquid activator, and optionally water.

According to a second aspect is provided a refined composition comprising the composition of the first aspect processed into a powder-like substance or granules having a Carr index value below 40, preferably below 16, most preferably below 10; or a Hausner ratio below 1.6, preferably below 1.25, most preferably below 1.1.

According to a third aspect is provided a dry product comprising the composition of any of the preceding aspect in a dry state.

According to fourth aspect is provided a re-activated composition obtainable by a method comprising
a. Mixing the dry product or the refined composition with water or an aqueous medium to obtain a mixture.
b. Hydrating the mixture, preferably up to 1 day, most preferably up to 20 minutes, to obtain a hydrated mixture.
c. Mixing the hydrated mixture, preferably using high shear mixing, until reactivated.

According to a fifth aspect is provided a use of the composition, the dry product or the re-activated composition of any preceding aspect for moulding or extruding.

According to a further aspect is provided a method of producing an object by extrusion or molding comprising using the composition of the preceding aspects, the refined composition of the preceding aspects, the re-activated composition of the preceding aspects or a mixture comprising fibrillated parenchymal cellulose and resin.

According to a sixth aspect is provided a product comprising the composition, the dry product, or the re-activated composition of any preceding aspect in a form having a maximum dimension of 50 mm, preferably 0.05-15 mm, most preferably 1-10 mm and a packaging density between 100 and 1500 kg/m$^3$, preferably 300-800 kg/m$^3$.

According to a seventh aspect is provided a method for producing the composition of the first aspect comprising:
a. Adding a liquid activator to a composition comprising by weight 10-50% parenchymal cell cellulose, most preferably 15-30%; and up to 90% water; and
b. Refining the parenchymal cell cellulose mixture into a fibrillated parenchymal cellulose mixture.

According to an eighth aspect is provided a method for producing the composition of the first aspect comprising:
a. Adding a liquid activator to a composition comprising by weight 10-50% fibrillated parenchymal cellulose, most preferably 15-30%; and up to 90% water, to obtain a fibrillated parenchymal cellulose mixture.

According to a ninth aspect is provided a use of the composition, the dry product, or the re-activated composition of any preceding aspect as an additive or component for modifying one or more of: viscosity, mechanical properties, strength, stiffness, toughness, binding properties, suspension stability, gel insensitivity to temperature, material insensitivity to temperature, shear reversible gelation, yield stress, and liquid retention of the composition of matter.

Compositions whose rheological or mechanical properties may be modified in this manner include foods, feeds, pharmaceuticals, nutraceuticals, personal care products, fibres, composite materials, non-woven materials, biomedical applications, papers, boards, paints, coatings, inks, glues and construction compositions. More specifically, possible compositions include oral care products; creams or lotions for epidermal application, including moisturizing, night, anti-age, or sunscreen creams or lotions; food spreads, including reduced fat, low fat, or fat free food spreads (for example, mayonnaise); feed compositions; paper and board products; and drilling fluids.

DETAILED DESCRIPTION

An "activator" is either a liquid substance or solution. Preferably it comprises 0-30% water by weight and liquid water miscible substance that facilitates the "re-activation" of the dry product. Non-limiting examples of liquid activators include: glycerol, polyol, polyol mixture, polyol mixture with up to 40% water, polyethylene glycol with a molecular weight below 1000 g/mol, and mixtures thereof.

"Re-activation" or "re-suspending", in the context of this disclosure, indicates a dry state composition or dry product which has been re-suspended into water and the rheology profile preferably demonstrates shear-thinning aqueous gels and/or 50% of the original viscosity as before the drying.

A "dry product" or "dry state" in the context of this disclosure is a composition in a form of a pellet, a compressed tablet, powder, or a granule that preferably demonstrates little self-adhesive properties and preferably does not stick to other surfaces it is in contact with. A "dry product" or "dry state" may comprise fibrillated parenchymal cellulose, at least one liquid activator, and optionally other substances, such as water, a water miscible substance(s), at least one additional substance, and/or an oily substance(s), or mixtures of the aforementioned substances.

The dry product, when ground into a powder-like substance or granules, is called "flowing dry product", and has a Carr index value below 40, below 16, most preferably below 10. The dry product or product in the dry state, when ground into a powder-like substance or granules, has a Hausner ratio below 1.6, preferably below 1.25, most preferably below 1.1.

"Parenchymal cell cellulose", in the context of this disclosure, means plant based parenchymal cells, which are mostly liberated from the other cellular components except the cellulose located in the primary cell walls. A highly suitable method to extract parenchymal cell cellulose as ghost cells is by base treatment or extraction of a suitable raw material. Examples of these kinds of materials are parenchymal cellulose rich side streams from pectin factories that utilize e.g. citrus peel, apple residuals, or sugar beet as a pectin source. Correspondingly, parenchymal cellulose rich side streams from potato or cassava based starch factories are especially well suitable raw materials. In the context of this application, parenchymal cell cellulose is processed raw material comprising predominantly of the cellulose rich primary cell wall cellulose. Typically, said parenchymal cell cellulose is obtained through base treatment or extraction of the parenchymal raw material.

"Fibrillated parenchymal cellulose" in context of this disclosure means refined parenchymal cellulose microfibrils or parenchymal cellulose microfibril bundles isolated from suitable raw materials that contain parenchymal cells. The aspect ratio of the refined microfibrils is typically very high; the length of the microfibrils may be more than one micrometer and the number-average diameter is typically less than 200 nm, such as between 2 and 100 nm. The diameter of microfibril bundles may be greater, but it is usually less than 1 μm. The smallest microfibrils are similar to the so-called elementary fibrils, the diameter of which is typically 2 to 12 nm. Fibrillated parenchymal cellulose may also contain other polysaccharides, such as pectin, the amount of which, for example, depends on the raw material used and the processing method.

In the context of this disclosure, "drying" is a process wherein water is removed by the use of a suitable method to yield a dry product.

In an embodiment the dry product contains up to 15% water, depending on the temperature and humidity. In another embodiment the dry product has a maximum water content of 15% by weight, preferably 10%, most preferably 5%.

In the context of this disclosure, room temperature is 20 degrees and normal atmospheric pressure.

In an embodiment, the liquid activator is a water miscible activator.

In another embodiment the liquid activator is a solution comprising liquid water miscible activator and 30% water by weight, such as a solution comprising 70% sorbitol and 30% water.

In a preferable embodiment, the activator has a molecular weight below 2000 g/mol, preferably below 1000 g/mol.

In a preferable embodiment, the activator is a food or feed ingredient or additive.

In a preferable embodiment, the activator is glycerol, a liquid hydrated sugar, propylene glycol, or oligomeric or polymeric polyethylene oxide.

In a preferable embodiment, the activator is liquid at room temperature, such as at 20 degrees.

In an embodiment the composition comprises 1-50% by weight liquid activator. In another embodiment the composition comprises 1-45, 1-40, 1-35, 1-30, 1-25, 1-20, 1-15, 1-10, or 1-5% by weight liquid activator. The percentages indicate the amount before drying.

In an embodiment the activator has at least one binding site that can physically or chemically bind with cellulose.

In a preferable embodiment, the additional substance is a food or feed ingredient or additive.

In an embodiment, the additional substance is an oily substance or a non-water miscible oil. In an embodiment the non-water miscible oil is selected from animal based, vegetable based, extracted from trees, petrochemical in origin, volatile, non-volatile, natural, and chemically modified oils, or a mixtures thereof.

In an embodiment the additional substance is an oily substances that can be compounded into either a wet fibrillated parenchymal cell cellulose suspension, or a dry fibrillated parenchymal cellulose product, or both.

In an embodiment the activator facilitates re-activation of the dry product, which is obtainable by drying the composition to a dry state comprising 20-99% fibrillated parenchymal cellulose; at least 1% liquid activator, and optionally water. Additional substances may also be present in the dry product.

In an embodiment the dry state composition comprises by weight 20-99% fibrillated parenchymal cellulose; 1-80% at least one liquid activator; 0-15% water; and 0-79% at least one additional substance.

In an embodiment the dry product contains at least one emulsifying agent.

In an embodiment the emulsifying agent is selected from the group consisting of an amphiphilic molecule, amphiphilic polymer, surfactant, polymer, polyelectrolyte, copolymer, and blockcopolymer.

In an embodiment a mixture of fibrillated parenchymal cellulose and at least one liquid activator with the additional substance, i.e. "wet fibrillated parenchymal cellulose mixture", is dried into a dry state, i.e. into a "dry product", using a suitable method, such as a fluidized bed; rotary drum dryer, or a method that continuously agitates the wet mixture, and/or utilizes convection drying.

In an embodiment the dry product contains gas voids.

In a preferable embodiment, the drying is conducted for a pelletized product, i.e. "wet pellets", obtained for example by using extrusion. The wet pellets preferably have dimensions of 0.5 to 1.5 cm in length and 0.1 to 0.5 cm in diameter. Their shape is preferably cylindrical. Preferably, the pellets substantially retain their shape after drying to a dry state, i.e. "dry pellets", but their dimensions can shrink depending on the amount of water removed. A dry pellet is an embodiment of the dry product.

In an embodiment the dry product or the dry pellets that are in the dry state are further processed into a flowing powder or crumble, i.e. they provided as "a flowing dry product".

In an embodiment the flowing dry product is compressed into pellets and/or tablets. In an embodiment said compression is carried out after adding an additional substance to help facilitate binding or disintegration. After adding said additional substance, the product does not necessarily remain in the dry state. Said additional substance can be water, a water miscible substance, oily substance, a salt, polyelectrolyte, polymer, acid, base or a polymerizable substance.

In an embodiment the dry product comprises fibrillated parenchymal cellulose, at least one added liquid activator, optionally water, and optionally a binding substance.

In a preferable embodiment the dry product is a free flowing product.

In an embodiment the dry product processed into a flowing dry product has a Carr index value below 40, preferably below 16, most preferably below 10; and/or a Hausner ratio below 1.6, preferably below 1.25, most preferably below 1.1.

In an embodiment the dry product or dry mixture is re-suspended into aqueous phase where the parenchymal cellulose suspension has a Brookfield viscosity of at least 10 mPas in water, preferably at least 100 mPas, measured at concentration of 1.0 weight-% at 100 rpm shear rate and/or a turbidity value less than 1000 NTU, preferably in the range of 100-700 NTU, measured at 0.1 weight-% concentration after re-suspending the dry product.

In an embodiment the additional substance is a liquid substance, which chemically or physically interacts with the fibrillated parenchymal cellulose phase in a way that can affect the mechanical properties of the dry mixture.

In an embodiment the liquid substance chemically or physically interacts with the fibrillated parenchymal cellulose phase in a way that can affect the water intake of the dry mixture.

In an embodiment the composition comprises at least one additional substance embedded within the dry product. The substance is preferably capable of being extracted or released from the dry product.

In an embodiment the at least one additional substance embedded within the dry product can be selectively extracted or released.

In an embodiment the at least one additional substance is selected from water, a water miscible substance(s), an oily substance(s), a food ingredient, a food additive, a feed ingredient, a feed additive, a fragrance, a pesticide, a herbicide, an insecticide, a fungicide, a rodenticide, a biocide, a fertilizer, a protein, a soap, an emulsifier, a polymer, and mixtures thereof. The extracted substance can be a single substance or a mixture of the aforementioned substances.

In an embodiment the additional substance has at least one binding site that can physically or chemically bind with cellulose.

In an embodiment extraction or release is carried out by suspending the dry product into a continuous phase. In another embodiment said continuous phase is water, a water miscible phase or an oily phase.

In an embodiment extraction or release is carried out by embedding the dry product into soil.

In an embodiment extraction or release is in a gas phase, such as air.

In an embodiment extraction or release occurs over time and the extracted or released substance is released into the air as a gas or aerosol.

In an embodiment extraction or release occurs over time and the extracted or released substance is released into the soil.

A suitable method to produce the dry state composition comprises:
a. Adding the liquid activator and optionally additional substance(s) to composition comprising by weight 10-50% parenchymal cell cellulose, preferably 10-30%, most preferably 15-30%; and up to 90% water.
b. Refining the parenchymal cell cellulose mixture into a fibrillated parenchymal cellulose mixture.
c. Extruding the fibrillated parenchymal cellulose mixture into wet pellets.
d. Drying the wet pellets into a dry state.

Alternatively, the liquid activator and/or additional substance(s) can be added to fibrillated parenchymal cellulose before drying.

In an embodiment, the product in the dry state is for use as an additive or component to be used to modify one or more of: viscosity, mechanical properties, strength, stiffness, toughness, binding properties, suspension stability, gel insensitivity to temperature, material insensitivity to temperature, shear reversible gelation, yield stress, and liquid retention of the composition of matter.

Compositions whose rheological or mechanical properties may be modified in this manner include foods, feeds, pharmaceuticals, nutraceuticals, personal care products, fibres, composite materials, non-woven materials, biomedical applications, papers, boards, paints, coatings, and construction compositions. More specifically, possible compositions include oral care products; creams or lotions for epidermal application, including moisturizing, night, anti-age, or sunscreen creams or lotions; food spreads, including reduced fat, low fat, or fat free food spreads (for example mayonnaise); feed compositions; paper and board products; and drilling fluids.

In an embodiment the additional substance contains at least two binding sites, i.e. it is a "binding substance" that physically or chemically binds with the fibrillated parenchymal cellulose and affects the mechanical properties and/or the water intake properties of the dry mixture.

In an embodiment the additional substance is a monomer that can be polymerized using a specific radical initiator or by with external stimuli, such as heat, visible light or ultra violet light. Said monomers and subsequent polymer(s) can physically or chemically interact with the fibrillated parenchymal cellulose preferably to enhance the mechanical properties and/or change the dry mixtures water intake properties. Said monomeric substance can be a molecule or polymer containing at least one polymerizable group, preferably a carbon double bond, isocyanates, anhydrides, carboxylic acids, amines, hydroxides, thiols, or epoxide.

In an embodiment the activator is a desired component in the formulation having an inherent chemical, functional and nutritional value in the final product that can be beneficial in further applications.

In an embodiment the "re-suspended" or "re-activated" product has at least 75% of the original viscosity profile before drying.

In an embodiment the liquid activator physically interacts with fibrillated parenchymal cellulose. Said physical interaction can affect how quickly the dry product can be hydrated and re-suspended by, without binding to any theory, protecting the fibrillated parenchymal cellulose from irreversible hornification by screening the fibril surfaces with a dynamic amorphous phase.

In an embodiment the dry product can be moulded and/or extruded as is.

In an embodiment, at least one additional substance is added to the dry product to yield a "premixture". After adding said additional substance, the mixture does not necessarily remain in the dry state. Said additional substance can be water, a water miscible substance, oily substance, a salt, polyelectrolyte, polymer, acid, base or a polymerizable substance.

In a preferred embodiment the additional substance is a resin. In an embodiment the premixture is moulded and/or extruded.

In an embodiment the premixture is moulded and/or extruded using external stimuli in addition to pressure and/or compression. Said external stimuli can be heat.

In an embodiment the composition of any preceding aspect has a Brookfield viscosity of at least 50% as compared to the same never-dried composition.

In an embodiment the composition of any preceding aspect has a Brookfield viscosity of at least 10 mPas in water, preferably at least 100 mPas, measured at concentration of 1.0 weight-% at 100 rpm shear rate and/or a turbidity value less than 1000 NTU, preferably in the range of 100-700 NTU, measured at 0.1 weight-% and/or a sedimentation volume of at least 1 ml, preferably in the range of 5-13 ml, measured for 13 ml sample volume at 0.1 weight-% concentration before drying.

In an embodiment the composition of the first aspect, the refined composition of the second aspect, or the re-activated composition of the third aspect is for moulding and/or extruding.

In an embodiment the method comprises formulating the fibrillated parenchymal cellulose mixture into wet pellets, granules, tablets, or to a powder-like substance; and drying, and optionally adjusting the shape or texture.

In another embodiment the dried product is activated or re-activated using a combination of hydrating and mixing. The re-activated product has preferably at least 75% of the original viscosity profile before drying.

In an embodiment the method of activation to obtain a re-activated composition comprises
a. Mixing the dry product or the refined composition with water or water miscible medium to obtain a mixture.
b. Hydrating the mixture, preferably up to 1 day, most preferably up to 20 minutes, to obtain a hydrated mixture.
c. Mixing the hydrated mixture, preferably using high shear mixing, until reactivated.

In an embodiment the method of activation to obtain a re-activated composition comprises
a. Mixing the dry product or the refined composition with resin, monomer, or molten polymer to obtain a premixture;
b. Mixing said premixture, preferably up to 1 day, most preferably 1 minute; and preferably using high shear mixing until re-activated, preferably using an extruder, kneader, or a Banbury mixer.

In an embodiment the liquid activator is in liquid form at room temperature, and optionally the liquid activator comprises glycerol, sorbitol, polyol, polyol mixture, polyol solution with up to 40% water, or polyethylene glycol with a molecular weight below 1000 g/mol.

In an embodiment the composition is in the form of pellets, tablets, granules, or powder.

In an embodiment the amount of fibrillated parenchymal cellulose in the composition or the dry product is by weight 20-99%, preferably 30-60%, most preferably 30-50%.

In an embodiment the fibrillated parenchymal cellulose is obtained from soybean hulls, pea hulls, corn hulls, bagasse, corn, vegetables, cassava, citrus peel, rice, sugar beet, potato pulp, fruits, or mixtures thereof.

In an embodiment the composition is obtainable by the method of the seventh or the eighth aspect.

In an embodiment the composition or the dry product comprises at least one additional substance, which is preferably extractable at a molecular level or releasable as a solid particulate, liquid, gas, aerosol, or solute.

In an embodiment the additional substance can be added to the parenchymal crude product or product without an activator to yield beneficial properties. Thus, in certain embodiments the additional substance can be added to the dry product without the activator.

In an embodiment the activator contains at least two binding sites, i.e. it is considered to be a "binding substance" that physically or chemically binds with the fibrillated parenchymal cellulose and affects the mechanical properties and/or the water intake properties of the wet and/or dry mixture.

In an embodiment an activator can be a monomer, pre-polymer, or resin that can be polymerized using a specific radical initiator or by with external stimuli, such as heat, visible light or ultra violet light. Said monomers and subsequent polymer(s) can physically or chemically interact with the fibrillated parenchymal cellulose preferably to enhance the mechanical properties and/or change the dry mixtures water intake properties. Said monomeric substance can be a molecule or polymer containing at least one polymerizable group, preferably a carbon double bond, isocyanates, anhydrides, carboxylic acids, amines, hydroxides, thiols, or epoxides.

In an embodiment the activator or additional substance can be an epoxy, urethane, phenyl formaldehyde, furfuryl alcohol, ligning, or lignin derivative.

In an embodiment the activator is a cellulose derivative.

In an embodiment at least one substance that is considered to be an activator is added to the dry product to yield a "premixture". After adding said activating substance, the mixture does not necessarily remain in the dry state. Said activator can be a water miscible substance, oily substance, a salt, polyelectrolyte, polymer, acid, base or a polymerizable substance.

In an embodiment the premixture is moulded and/or extruded. In a preferred embodiment it s moulded by compression moulding.

In a preferred embodiment the compression moulding is carried out using a dry product having a water content below 20%, more preferably below 15% and most preferably below 10%. The dry product may be manufactured by mixing fibrillated parenchymal cellulose and resin, extruded the mixture into pellets, and drying the pellets.

In an embodiment the premixture is moulded and/or extruded using external stimuli in addition to pressure and/or compression. Said external stimuli can be heat.

In an embodiment the premixture that contains an activator and/or additional substance and/or water can be refined into a mouldable form. Said premixture preferably contains a polymerizable group and has affinity to cellulose.

In an embodiment the premixture can be moulded into a substantially two dimensional or three dimensional shape.

In an embodiment the premixture is under external stimulus before and/or simultaneously and/or after moulding. Preferably the premixture contains a polymerizable activator and/or polymerizable additional substance that polymerize under said external stimulus.

In an embodiment mixing the dry mixture is carried out up to 1 day, most preferably 1 minute. In another preferable embodiment in mixing a high shear mixing is used until the composition is re-activated. The high shear mixing can be carried out preferably using an extruder, kneader, or a Banbury mixer.

In an embodiment the re-activated composition has a Brookfield viscosity of at least 50% as compared to the same never-dried composition.

In an embodiment the re-activated composition is shear thinning as a 1-5% aqueous suspension.

In an embodiment the re-activated composition is shear thinning as a gel.

In an embodiment the re-activated composition has a sedimentation volume of at least 1 ml, preferably in the range of 5-13 ml, measured for 13 ml sample volume at 0.1 weight-%.

In an embodiment the composition, re-activated composition or product of any preceding aspect comprises a binding substance, a monomer or both.

In an embodiment the method for producing the composition comprises formulating the fibrillated parenchymal cellulose mixture into wet pellets, granules, tablets, or to a powder-like substance; and drying, and optionally adjusting the shape or texture.

In an embodiment the method for producing the composition comprises adding in step a. at least one additional substance.

EXAMPLES

The following examples are provided to illustrate various aspects of the present disclosure. They are not intended to limit the present disclosure, which is defined by the accompanying claims.

Example 1

Production of Fibrillated Parenchymal Cellulose Based on Potato Pulp

Concentrated potato pulp was purified in a lye wash. Here, the potato pulp (solids 2500 g) was taken to a 25 g/L suspension and heated to 60-90° C. With gentle stirring, 20 g/L NaOH was added. During this time, the hydrated potato clippings lost their solid-like morphology and broke down into a dark brown viscous mass within a minute. After 120 minutes of stirring, the reaction was cooled down and filtrated through a steel screen (0.25 mm pore size). The lye-washed pale grey cellulosic potato mass was further washed with copious amounts of water. The obtained material was dispersed into water at 3.5 wt % concentration and fibrillated using a high speed rotor-rotor mixer (1800 rpm) at pH 8-10.

Production of Fibrillated Parenchymal Cellulose Based on Sugar Beet Pulp

Compressed sugar beet pulp from a sugar factory was purified in a two-step process. Sugar beet clippings (2500 dry g) were taken to a 25 g/L suspension. The pH of the reaction suspension was set to 2, using 1.0 M HCl. The suspension of sugar beet pulp was heated to 70-80 degrees and gently stirred for 120 minutes. Next, the ensuing beet clippings were filtered through a steel mesh screen (0.25 mm pore size) and further washed with copious amounts of water.

After the acid wash, the hydrated sugar beet pulp was washed in lye. Here, pulp was taken to a 25 g/L suspension and heated to 70-80° C. With gentle stirring, 20 g/L NaOH was added. During this time, the hydrated beet clippings lost their solid-like morphology and broke down into a dark brown viscous mass. After 120 minutes of stirring, the reaction was cooled down and filtrated through a steel screen (0.25 mm pore size). The lye-washed pale grey cellulosic sugar beet mass was further washed with copious amounts of water. The obtained material was concentrated by pressing to 10 wt % concentration and fibrillated using a high speed rotor-rotor mixer (1800 rpm) at pH 8-10.

Example 2

Characterization of the Microfibrillar Parenchymal Cellulose

Activation of Fibrillated Parenchymal Cellulose

Dried samples were prepared to 1 wt-% concentration based on cellulose content and allowed to hydrate at room temperature for 20 minutes. The samples were then mixed with a shearing mixer, (Bamix mixer, 17000 rpm, three times 10 seconds with a resting period of 20 seconds between the intervals), followed by degassing in vacuum to remove the entrapped air bubbles in the sample.

Viscosity, Turbidity and Sedimentation Volume

The viscosity of the fibrillated parenchymal cellulose was measured by Brookfield DV3T viscosimeter (Brookfield Engineering Laboratories, Middleboro, USA) equipped with a vane geometry (V-72, diameter 21.67 mm, length 43.38 mm). The samples were measured at 1 wt-% and the temperature was adjusted to 20° C. prior to measurements. The viscosity of the samples was measured at 50 and 100 rpm shear rates.

Turbidity of dilute aqueous dispersions of fibrillated parenchymal cellulose was measured with HACH P2100 turbidimeter. The product was diluted with water to a concentration of 0.1 wt %, and the sample was agitated for 10 min before the measurement followed by degassing in vacuum to remove the entrapped air bubbles in the sample. The temperature was adjusted to 20° C. prior to the measurement where the emission of light scattered from particles of a sample was detected The sedimentation volume was determined for 0.1 wt-% cellulose content in transparent 15 ml Falcon test tubes. A total of 13.0 ml sample volume was used and allowed to stand at room temperature for 24 hours to obtain the sedimentation volume ie. the volume occupied by the sediment material.

Example 3

Dry Compositions

Non-bleached fibrillated sugar beet pulp was mixed with different amounts of an activator that was either a polyol mixture (66.4% non-volatile compounds comprising xylitol 42%, arabinitol 15%, reducing sugars 9.6%, and sorbitol 8%), glycerol (anhydrous grade 99%, Merck); or D-sorbitol 98%, Sigma-Aldrich used as 68 wt-% water solution) by hand-kneading until a uniform consistency was obtained. 100 g of sugar beet based fibrillated parenchymal cellulose (21.58% solids content) was kneaded together with 16-65 g of polyol or glycerol. The cellulose/activator weight-ratios were approximately 2:1, 1:1, 2:3 and 1:2. A reference sample without an activator was also produced (only water was added to facilitate extrusion to wet pellets).

The mixtures were extruded though a syringe to produce 2 mm diameter wet-pellets, which fractured to short pellets (0.5-1 cm) by gentle shaking. Batch mixture (PO-05) was not pelletized but grounded by hand to powder form.

In the drying experiments, 100-150 g of these pellets were loaded to the lab-scale fluidized bed dryer (Retsch TG 200) and allowed to dry in 2 minute increments at 80° C. with an air flow setting of 99 and the pellets were weighed after each increment.

The composition of dry state pellets before and after drying, as well as the packing-density of the obtained pellets are listed in Table 1.

TABLE 1

Drying conditions and compositions of polyol/fibrillated parenchymal cellulose pellets.

| Entry | Pulp content Before drying (wt-%) | Polyol content before drying (wt-%) | We-Pellet loading to Retsch (g) | Drying time at 80° C. (min) | Pulp content (wt-%) | Additive content (wt-%) | Packing density (kg/m3) |
|---|---|---|---|---|---|---|---|
| PO-00 (polyol) | 18.6 | 0.0 | 111 | 12 | 89.9 | 0.0 | 487 |
| PO-01 (polyol) | 18.6 | 9.2 | 110 | 14 | 62.5 | 30.8 | 562 |
| PO-02 (polyol) | 16.4 | 16.1 | 123 | 18 | 47.7 | 47.0 | 539 |
| PO-03 (polyol) | 13.1 | 26.2 | 157 | 42 | 31.6 | 63.2 | 436 |
| PO-04 (polyol) | 14.9 | 20.6 | 141 | 18 | 38.6 | 53.4 | 499 |
| PO-05 (polyol, powder form) | 16.4 | 16.1 | 129 | 32 | 47.9 | 47.2 | 611 |
| PO-08 (glycerol) | 19.4 | 9.8 | 112 | 10 | 63.4 | 32.0 | 669 |
| PO-09 (glycerol) | 17.7 | 17.9 | 122 | 10 | 46.9 | 47.3 | 606 |
| PO-10 (glycerol) | 16.3 | 24.2 | 134 | 10 | 37.9 | 56.4 | 621 |
| PO-11 (glycerol) | 15.0 | 30.3 | 141 | 12 | 31.5 | 63.6 | 564 |
| PO-14 (sorbitol) | 13.2 | 26.3 | 77 | 12 | 30.3 | 60.6 | 391 |
| PO-15 (propylene glycol) | 13.9 | 28.3 | 75 | 8 | 38.5 | 61.5 | 464 |
| PO-16 (polyol) | 19.6 | 6.0 | 54 | 8 | 70.4 | 21.7 | 572 |

The above produced pellets were reactivated as follows: Pellets were weighed in a cylindrical straight-walled 250 ml polypropylene container and distilled water to obtain a total weight of 240 g with target cellulose concentration of 1.00%. The pellets were allowed to hydrate for 20 minutes at room temperature, after which they were dispersed with a shearing mixer (Bamix mixer, 17000 rpm, three times 10 seconds with resting periods of 20 seconds between intervals). The pH was measured to be between 8.3-8.8 for all suspensions. The air bubbles were removed in reduced pressure with magnetic stirring and vortex stirring for viscometer characterization. After the viscometer measurements, the turbidities and sedimentation volumes of the dispersions were recorded. Table 2 summarizes the viscosities, turbidities and sedimentation volumes for tested fibrillated parenchymal cellulose/additive compositions for 20 minute activation time. The sedimentation volume was determined for 0.1 wt-% cellulose content in transparent 15 ml Falcon test tubes (diameter 15 mm, height 120 mm). A total of 13.0 ml sample volume was used and allowed to stand at room temperature for 24 hours to obtain the volume of sedimented material.

The liquid activator can be easily mixed with parenchymal cellulose and thereafter formed to a defined shape, such as pellets. The water can then be selectively removed by convection and heat to obtain low moisture content pellets, which is important for reducing bacterial growth and to prolong shelf-life. The defined uniform dimensions of the material (eg. pellets) is beneficial for the drying process, since a controlled evaporation of water is achieved. The pellets are also logistically easy and conveniently pourable to eg. reactors and mixers, which is an important feature considering commercial applications. The polyol containing pellets are easily hydrated and dispersed in water, and as seen in table 2, the dispersion properties are superior to the PO-00 reference formulation without activator. It also of importance, that the activator is cheap, readily available and non-toxic. Further it can have an inherent chemical, functional or nutritional value in the final product that can be beneficial in further applications thereof.

TABLE 2

Viscosities, turbidities and sedimentation volumes for tested fibrillated parenchymal cellulose/activator compositions for 20 minute activation time.

| Entry | Composition | Viscosity at 50 rpm (mPa * s) | Viscosity at 100 rpm (mPa * s) | Turbidity (NTU) | Sedimentation volume (ml) |
|---|---|---|---|---|---|
| Reference Never-dried | Cellulose | 370 | 210 | 640 | 5.75 |
| PO-00 (0%) | Cellulose | 49* | 43* | 760 | 1.0 |
| PO-01 (30.8%) | Polyol:Cellulose 1:2 | 200* | 120 | 750 | 4.0 |
| PO-08 (32.0%) | Glycerol:Cellulose 1:2 | 220* | 130 | 780 | 4.5 |
| PO-02 (47.0%) | Polyol:Cellulose 1:1 | 330 | 190 | 700 | 5.5 |

TABLE 2-continued

Viscosities, turbidities and sedimentation volumes for tested fibrillated parenchymal cellulose/activator compositions for 20 minute activation time.

| Entry | Composition | Viscosity at 50 rpm (mPa * s) | Viscosity at 100 rpm (mPa * s) | Turbidity (NTU) | Sedimentation volume (ml) |
|---|---|---|---|---|---|
| PO-09 (47.3%) | Glycerol:Cellulose 1:1 | 340 | 190 | 750 | 5.75 |
| PO-04 (53.4%) | Polyol:Cellulose 3:2 | 390 | 230 | 720 | 6.5 |
| PO-10 (56.4%) | Glycerol:Cellulose 3:2 | 380 | 220 | 750 | 5.75 |
| PO-03 (63.2%) | Polyol:Cellulose 2:1 | 400 | 290 | 630 | 5.5 |
| PO-03 (63.2%) never-dried | Polyol:Cellulose 2:1 | 490 | 300 | 700 | — |
| PO-11 (63.6%) | Glycerol:Cellulose 2:1 | 420 | 240 | 740 | 6.0 |
| PO-11 (63.6%) never-dried | Glycerol:Cellulose 2:1 | 420 | 250 | 680 | 6.0 |
| PO-16 | Polyol:Cellulose 1:3.2 | 180 | 100 | 690 | 4.25 |

*Viscosity values below the 10% torque limit for reliability given for the instrument.

Example 4

Dry Oil Parenchymal Cellulose Composition

Non-bleached fibrillated sugar beet-based fibrillated parenchymal cellulose was mixed by kneading with different amounts of commercial tall-oil (colored with Oil Blue N, Sigma-Aldrich 96%) until a uniform blue color was obtained. The emulsion mixtures were pelletized using extrusion through a 4 mm or 2 mm hole-plate. In the drying experiments, 50-700 g of these wet pellets were loaded to the lab-scale fluidized bed dryer and allowed to dry in 2 or 5 minute increments at 80° C. with an air flow setting of 99 and the pellets were weighed on each increment. The final composition of the dry state pellets are listed in Table 3.

TABLE 3

Drying conditions and compositions of oil/fibrillated parenchymal cellulose pellets.

| Entry | Pulp content before drying (wt-%) | Oil content before drying (wt-%) | Lecithin content before drying (wt-%) | Drying time at 80° C. (min) | Pulp content (wt-%) | Oil content (wt-%) | Lecithin content (wt-%) | Appearance |
|---|---|---|---|---|---|---|---|---|
| RP-01 (tall-oil) | 14.6 | 3.7 | 0 | 25 | 77.4 | 19.4 | 0 | dry |
| RP-03 (tall-oil) | 13.8 | 9.2 | 0 | 20 | 58.9 | 39.3 | 0 | dry |
| RP-04 (tall-oil) | 13.2 | 13.2 | 0 | 20 | 38.7 | 38.7 | 0 | oily |
| RP-06 (tall-oil lecithin) | 16.5 | 16.6 | 0.2 | 14 | 45.9 | 46.2 | 0.5 | dry |
| RP-09 (tall-oil lecithin) | 14.7 | 22.2 | 3.7 | 14 | 36.9 | 55.7 | 9.3 | dry |
| RP-10 (tall-oil lecithin) | 13.7 | 27.6 | 3.5 | 14 | 29.7 | 59.7 | 7.5 | dry |
| LSO-01 (linseed oil) | 18.0 | 16.7 | 0 | 8 | 49.3 | 45.7 | 0 | dry |
| LSO-02 (linseed oil) | 15.3 | 29.1 | 0 | 10 | 31.6 | 60.0 | 0 | oily |
| LEC-01 (lecithin) | 19.6 | 0 | 9.1 | 10 | 66.3 | 0 | 30.7 | dry |

The above produced pellets were reactivated as follows: Pellets were weighed in straight-walled cylindrical 250 ml polypropylene container and distilled water to obtain a total weight of 240 g with target cellulose concentration of 1.00%. The pellets were allowed to hydrate for 20 minutes at room temperature, after which they were dispersed with shearing mixing (Bamix, 17000 rpm, three times 10 seconds with resting periods of 20 seconds between intervals). The air bubbles were removed in reduced pressure with magnetic stirring and vortex stirring before viscometer. After the viscometer measuring, the sedimentation volumes of dispersions was determined for 0.1 wt-% cellulose content in transparent 15 ml Falcon test tubes (diameter 15 mm, height 120 mm). A total of 13.0 ml sample volume was used and allowed to stand at room temperature for 24 hours to obtain the volume of the sedimented material.

This example shows that non-water dispersible liquid can be dispersed in parenchymal cellulose to form stable emulsions. Presumably, the nanofibrillar parenchymal cellulose fibril network provides structural support of dispersed droplets in aqueous media, enabling a high loading of tall-oil to be dispersed by a simple kneading-type of mixing, without phase separation. Further, the high solids content gel-type rheology of nanofibrillar parenchymal cellulose enables processing of these emulsion mixtures with conventional extrusion to defined forms, such as pellets, that could further be dewatered with conventional type of drying methods. It should be noted that, emulsions containing 1:1 weight ratio of tall-oil and nanofibrillar parenchymal cellulose showed phase-separation upon drying, but further stabilization with a conventional emulgator, such as lecithin, eliminated this effect. The pellets are also logistically easy, have better shelf-life and are conveniently pourable to eg. reactors and mixers, which is an important feature considering commercial applications. The oil-lecithin containing pellets are easily re-hydrated and dispersed in water, and as seen in table 4, forming again the stabilized emulsion.

TABLE 4

Viscosities and sedimentation volumes of redispersed oil/fibrillated parenchymal cell cellulose emulsion compositions for 20 minute activation time. The never-dried reference A is for entries RP and reference B for entries LSO and LEC.

| Entry | Composition | Viscosity at 50 rpm (mPa * s) | Viscosity at 100 rpm (mPa * s) | Sedimentation volume (ml) |
|---|---|---|---|---|
| Reference Never-dried | Cellulose (reference A) | 620 | 380 | 8.0 |
| RP-01 | Cellulose:tall oil 3:1 | —* | —* | 0.8 |
| RP-03 | Cellulose:tall oil 3:2 | —* | —* | 0.3 |
| RP-06 | Cellulose:tall oil:lecithin 1:1:0.01 | 380 | 240 | 4.0 |
| RP-09 | Cellulose:tall oil:lecithin 2:3:0.5 | 640 | 410 | 7.5 |
| RP-10 | Cellulose:tall oil:lecithin 1:2:0.25 | 570 | 370 | 7.0 |
| Reference Never-dried | Cellulose (reference B) | 370 | 210 | 5.75 |
| LSO-01 | Cellulose:Linseed oil 1:1 | —* | —* | 0.8 |
| LSO-02 | Cellulose:Linseed oil 1:2 | —* | —* | 1.0 |
| LEC-01 | Cellulose:Lecithin 2:1 | 200 | 120 | 3.5 |

*Viscosity values below the 10% torque limit for reliability given for the instrument.

The above aspects and embodiments of the present disclosure have certain advantages. The methods provide wet processing of stabilized emulsions to defined forms, such as pellets. The pellets are easily processed further e.g. in drum drier, float-bed dried, or similar conventional apparatus to reduce the amount of water to a desired level, retaining the emulsion, and water dispersion properties.

Different non-binding example aspects and embodiments of the present disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

Example 5

Dry Phenol-Formaldehyde Resin Parenchymal Cellulose Composition

Non-bleached fibrillated sugar beet-based fibrillated parenchymal cellulose 100 g (22% dry matter content) was mixed by kneading with 45 g of commercial phenol-formaldehyde resin (50%) until a uniform consistency was obtained. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa pressure for 30 minutes to obtain a stiff solid object. The example illustrates the formability of the dry resin composition to defined objects.

Example 6

Dry Latex Parenchymal Cellulose Composition

Non-bleached fibrillated sugar beet-based fibrillated parenchymal cellulose 300 g (20.7% dry matter content) was mixed by kneading with 150 g of commercial polyvinyl acetate latex (48%) until a uniform consistency was obtained. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa pressure for 10 minutes to obtain a stiff solid object. The example illustrates the formability of the dry thermoplastic hydrophobic latex composition to defined objects.

Example 7

Dry Epoxy Parenchymal Cellulose Composition

Non-bleached fibrillated sugar beet-based fibrillated parenchymal cellulose 100 g (22.3% dry matter content) was mixed by kneading with 10.8 g of commercial Bisphenol-A-epichlorohydrin resin until a uniform consistency was obtained. 2.2 g of polyamine based hardener was added to the mixture and mixed by kneading. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa for 10 minutes pressure to obtain a stiff solid object. The example illustrates the formability of the reactive dry hydrophobic resin composition to defined objects.

Example 8

Dry Resin Parenchymal Cellulose Composition

Non-bleached fibrillated sugar beet-based fibrillated parenchymal cellulose 100 g (22.3% dry matter content) was mixed by kneading with 10.6 g of commercial furfuryl alcohol based resin until a uniform consistency was obtained. 0.2 g of citric acid was added as catalyst and mixed by kneading. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa for 30 minutes pressure to obtain a stiff solid object. The example illustrates the formability of the dry hydrophobic resin composition to defined objects.

Example 9

Dry Lignin Parenchymal Cellulose Composition

Non-bleached fibrillated sugar beet-based fibrillated parenchymal cellulose 180 g (11.9% dry matter content) was mixed by kneading with 20.6 g of commercial kraft lignin (50%) until a uniform consistency was obtained. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 20% was reached. The obtained pellets were loaded to a compression mold, and compressed at 150° C. 1.5 MPa for 30 minutes pressure to obtain a stiff solid object. The example illustrates the formability of the lignin based composition to defined objects.

Example 10

Dry Resin Parenchymal Cellulose Composition Containing Lignin

Non-bleached fibrillated sugar beet-based fibrillated parenchymal cellulose 100 g (22.3% dry matter content) was mixed by kneading with 10.8 g of commercial Bisphenol-A-epichlorohydrin resin until a uniform consistency was obtained. 2.2 g of polyamine based hardener was added to the mixture, following the addition of 10 g of kraft lignin (50%) and mixed by kneading. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa for 10 minutes pressure to obtain a stiff solid object. The example illustrates the formability of the dry reactive resin composition to defined objects.

Example 11

Dry Resin Parenchymal Cellulose Composition Containing Lignin

Non-bleached fibrillated sugar beet-based fibrillated parenchymal cellulose 100 g (22.3% dry matter content) was mixed by kneading with 10.6 g of commercial furfuryl alcohol based resin until a uniform consistency was obtained. 10 g of kraft lignin was added and mixed by kneading. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa for 30 minutes pressure to obtain a stiff solid object. The example illustrates the formability of the dry reactive resin composition to defined objects.

Example 12

Dry Polyurethane Resin Parenchymal Cellulose

Non-bleached fibrillated sugar beet-based fibrillated parenchymal cellulose 100 g (22.3% dry matter content) was mixed by kneading with 10 g of a commercial water base polyurethane (40.3% solids content, reaction product of polybutadiene polyol, tolylene diisocyanate, polyoxypropylene triol and maleic anhydride) was mixed by kneading. The material was pelletized using extrusion through a 2 mm hole-plate. The wet pellets were loaded to the lab-scale fluidized bed dryer and allowed to dry in 5 minute increments at 80° C. with an air flow setting of 99 and until a water content below 10% was reached. The obtained dry pellets were loaded to a compression mold, and compressed at 150° C. 1.5 MPa for 10 minutes pressure to obtain a stiff solid object. Alternatively, fibrillated parenchymal cellulose was first mixed with the polyol component with a kneader, and then the residual water was removed and subsequentially mixed and reacted with isocyanate or other reactive compound to obtain a solid composite of polyurethane and fibrillated parenchymal cellulose. The examples illustrate the formability of the dry reactive resin composition to defined objects.

Without limiting the scope and interpretation of the patent claims, certain technical effects of one or more of the example embodiments disclosed herein are listed in the following: A technical effect is improved capability to resuspend a dried product. Another technical advantage is the processing of composition to defined forms, which facilitates removal of water, which both increases shelf-life and is logistically important. Yet another technical advantage is the inherent chemical, functional or nutritional value in the composition that can be beneficial in applications, such as reagent or monomer in composite applications or nutrient in feed applications.

The invention claimed is:
1. A composition comprising fibrillated parenchymal cellulose which is fibrillated to have microfibrils having a length of more than one micrometer and a number-average diameter of less than 200 nm, and at least one liquid activator selected from an isocyanate, anhydride, amine, thiol, and epoxide wherein the amount of fibrillated parenchymal cellulose in the composition is by eight 20-99%.

2. The composition of claim 1 wherein the liquid activator is a molecule containing at least one polymerizable group.

3. The composition of claim 1 wherein the fibrillated parenchymal cellulose is obtained from soybean hulls, pea hulls, corn hulls, bagasse, corn, vegetables, cassava, citrus peel, rice, sugar beet, potato pulp, fruits, or mixtures thereof.

4. The composition of claim 1 comprising at least one additional substance, which is extractable at a molecular level or releasable as a solid particulate, liquid, gas, aerosol, or solute.

5. The composition of claim 4 further comprising an oily substance or a non-water miscible oil.

6. A refined composition comprising the composition of claim 1 processed into a powder-like substance or granules having a Carr index value below 40 or a Hausner ratio below 1.6.

7. A dry product comprising the composition of claim 1 in a dry state.

8. A re-activated composition obtainable by a method comprising
    a. Mixing a dry product comprising the composition of claim 1, and optionally water into a powder-like substance or granules having a Carr index value below 40 or a Hausner ratio below 1.6;
    b. Hydrating the mixture up to 1 day to obtain a hydrated mixture; and
    c. Mixing the hydrated mixture until re-activated.

9. A re-activated composition obtainable by a method comprising
    a. Mixing a dry product comprising the composition of claim 1 at least one additional substance of an oily substance or a non-water miscible oil and optionally water with resin, monomer, or molten polymer to obtain a premixture;
    b. Mixing said premixture up to 1 day; until re-activated.

10. The re-activated composition of claim 9 having a Brookfield viscosity of at least 50% as compared to the same never-dried composition.

11. The re-activated composition of claim 9 having a sedimentation volume of at least 1 ml measured for 13 ml sample volume at 0.1 weight-%.

12. The composition of claim 1 comprising a binding substance, a monomer or both.

13. A method of producing an object by extrusion or molding comprising using the composition of claim 1.

14. The method of claim 13 wherein the composition comprises a binding substance, a monomer or both.

15. A product comprising the composition of claim 1 in a form having a maximum dimension of 50 mm and a packaging density between 100 and 1500 $kg/m^3$.

16. A method for producing the composition of claim 1 comprising:
    a. Adding a liquid activator selected from isocyanate, anhydride, amine, thiol, and epoxide in an amount of 1-25% to a composition comprising by weight 10-50% parenchymal cell cellulose which is fibrillated to have microfibrils having a length of more than one micrometer and a number-average diameter of less than 200 nm; and up to 90% water; and
    b. Refining the parenchymal cell cellulose mixture into a fibrillated parenchymal cellulose mixture.

17. A method for producing the composition of claim 1 comprising:
    a. Adding a liquid activator selected from selected from isocyanate, anhydride, amine, thiol, and epoxide in an amount of 1-25% to a composition comprising by weight 10-50% fibrillated parenchymal cellulose which is fibrillated to have microfibrils having a length of more than one micrometer and a number-average diameter of less than 200 nm, and up to 90% water.

18. The method of claim 17 further comprising formulating the fibrillated parenchymal cellulose mixture into wet pellets, granules, tablets, or to a powder-like substance; and drying, and optionally adjusting the shape or texture.

19. The method of claim 17 further comprising adding at least one additional substance.

20. A method for modifying one or more of: viscosity, mechanical properties, strength, stiffness, toughness, binding properties, suspension stability, gel insensitivity to temperature, material insensitivity to temperature, shear reversible gelation, yield stress, and liquid retention of a composition of matter by adding the composition of claim 1 to the composition of matter.

* * * * *

UNITED STATES PATENT AND TRADEMARK OFFICE
CERTIFICATE OF CORRECTION

PATENT NO. : 11,286,313 B2
APPLICATION NO. : 16/312600
DATED : March 29, 2022
INVENTOR(S) : Laukkanen et al.

Page 1 of 1

It is certified that error appears in the above-identified patent and that said Letters Patent is hereby corrected as shown below:

In the Claims

In Column 19, Line 3, in Claim 1, delete "by eight" and insert --by weight--.

Signed and Sealed this
Twenty-first Day of June, 2022

Katherine Kelly Vidal
*Director of the United States Patent and Trademark Office*